United States Patent [19]
Takeda

[11] Patent Number: 5,111,116
[45] Date of Patent: May 5, 1992

[54] STROBOSCOPIC CONTROLLER

[75] Inventor: Hiroshi Takeda, Funabashi, Japan

[73] Assignee: Ricoh Company, Ltd., Tokyo, Japan

[21] Appl. No.: 672,316

[22] Filed: Mar. 20, 1991

[30] Foreign Application Priority Data

Mar. 28, 1990 [JP] Japan .................................. 2-77003

[51] Int. Cl.$^5$ .......................................... H05B 41/32
[52] U.S. Cl. ............................ 315/241 P; 315/241 S; 315/151; 315/307; 354/127.1
[58] Field of Search ................ 315/241 P, 241 S, 151, 315/159, 241 R, 209 R, 307; 354/139, 137, 138, 127.1, 127.11, 416, 413

[56]  References Cited
U.S. PATENT DOCUMENTS 4,217,523  8/1980  Hirata ............................... 315/241 P Primary Examiner—Eugene R. LaRoche
Assistant Examiner—Ali Neyzari
Attorney, Agent, or Firm—Fish & Richardson

[57] ABSTRACT

A stroboscopic controller for illuminating a photographed object by discharging a charge stored to a main capacitor through a light emitting tube has a voltage measuring device for measuring a charging voltage of the main capacitor before light emission; a light quantity calculator for calculating a quantity of light required to illuminate the photographed object; a voltage calculator for calculating a voltage of the main capacitor at a stopping time of the light emission from the charging voltage measured by the voltage measuring device and the quantity of light calculated by the light quantity calculator; a time calculator for calculating a stroboscopic light emitting time for which the voltage of the main capacitor is changed by the stroboscopic light emission from the charging voltage before the light emission to the voltage at the stopping time of the light emission; and a light emission control device for controlling a light emitting operation and a stopping operation thereof with respect to the light emitting tube based on the stroboscopic light emitting time calculated by the time calculator.

8 Claims, 2 Drawing Sheets

STROBOSCOPIC CONTROLLER

BACKGROUND OF THE INVENTION

1. Field of the Invention

The present invention relates to a stroboscopic controller disposed in a camera and controlling a light emitting operation of a stroboscope and a stopping operation thereof.

2. Description of the Related Art

Stroboscopic controllers having various kinds of structures are generally proposed and manufactured. In a stroboscopic controller shown in Japanese Laid-open Patent Application (KOKAI) No. 56-114937, data indicative of a light emitting time and a quantity of emitted light in a stroboscope are stored to a ROM as a memory element in advance. A light emitting operation of the stroboscope is controlled by using these data. In a stroboscopic controller shown in Japanese Laid-open Patent Application (KOKAI) No. 56-159622, the light emitting time is determined on the basis of a quantity of light required to perform a photographing operation, a guide number of the stroboscope and a suitable coefficient. In a stroboscopic controller shown in Japanese Patent Publication (KOKOKU) No. 44-30905, light reflected from a photographed object is integrated to stop the light emitting operation. In a known stroboscopic controller of an automatic flashing system, a diaphragm value of a photographing lens is changed in accordance with distance. The stroboscopic controller of this system does not constitute an automatic stroboscope.

In the stroboscopic controller shown in Japanese Laid-open Patent Application (KOKAI) No. 56-114937, it is necessary to store a large amount of data indicative of the relation between the light emitting time and the emitted light quantity to the ROM. In the stroboscopic controller shown in Japanese Laid-open Patent Application (KOKAI) No. 56-159622, no voltage of a main capacitor before the light emission is considered so that it is impossible to control the operation of the stroboscopic controller with a high degree of accuracy. In the stroboscopic controller shown in Japanese Patent Publication (KOKOKU) No. 44-30905, it is necessary to dispose parts requiring high operating speed and accuracy in a light-receiving and integrating circuit. Accordingly, the cost of this stroboscopic controller is increased and a space therefor is large. Further, in this stroboscopic controller, there is a case in which an exposure value is shifted from a predetermined value by a difference in reflectivity of the photographed object, different stroboscopic light incident to the stroboscope, etc. In the automatic flashing system, no arbitrary diaphragm value can be obtained and light is emitted in a full state thereof at any time since this system does not constitute an automatic stroboscope. Therefore, it takes time to perform the next light emitting operation.

Accordingly, the general stroboscopic controllers have various kinds of practical problems mentioned above.

SUMMARY OF THE INVENTION

It is therefore an object of the present invention to provide a stroboscopic controller having a simplified structure and accurately emitting stroboscopic light.

The above object of the present invention can be achieved by a stroboscopic controller for illuminating a photographed object by discharging a charge stored to a main capacitor through a light emitting tube, the stroboscopic controller comprising voltage measuring means for measuring a charging voltage of the main capacitor before light emission; light quantity calculating means for calculating a quantity of light required to illuminate the photographed object; voltage calculating means for calculating a voltage of the main capacitor at a stopping time of the light emission from the charging voltage measured by the voltage measuring means and the quantity of light calculated by the light quantity calculating means; time calculating means for calculating a stroboscopic light emitting time for which the voltage of the main capacitor is changed by the stroboscopic light emission from the charging voltage before the light emission to the voltage at the stopping time of the light emission; and light emission control means for controlling a light emitting operation and a stopping operation thereof with respect to the light emitting tube based on the stroboscopic light emitting time calculated by the time calculating means.

In accordance with the above structure, discharging voltage and time for providing the quantity of light required to perform a photographing operation are calculated by the operations of the voltage calculating means and the time calculating means from the charging voltage of the main capacitor before the light emission. The light emitting operation and the stopping operation thereof with respect to the light emitting tube are controlled by the light emission control means based on the calculated charging voltage and time.

Accordingly, it is possible to provide a stroboscopic controller having a simplified structure and accurately emitting stroboscopic light.

Further objects and advantages of the present invention will be apparent from the following description of the preferred embodiments of the present invention as illustrated in the accompanying drawings.

DESCRIPTION OF THE PREFERRED EMBODIMENTS

The preferred embodiment of a stroboscopic controller in the present invention will next be described in detail with reference to the accompanying drawings.

Figure 1:
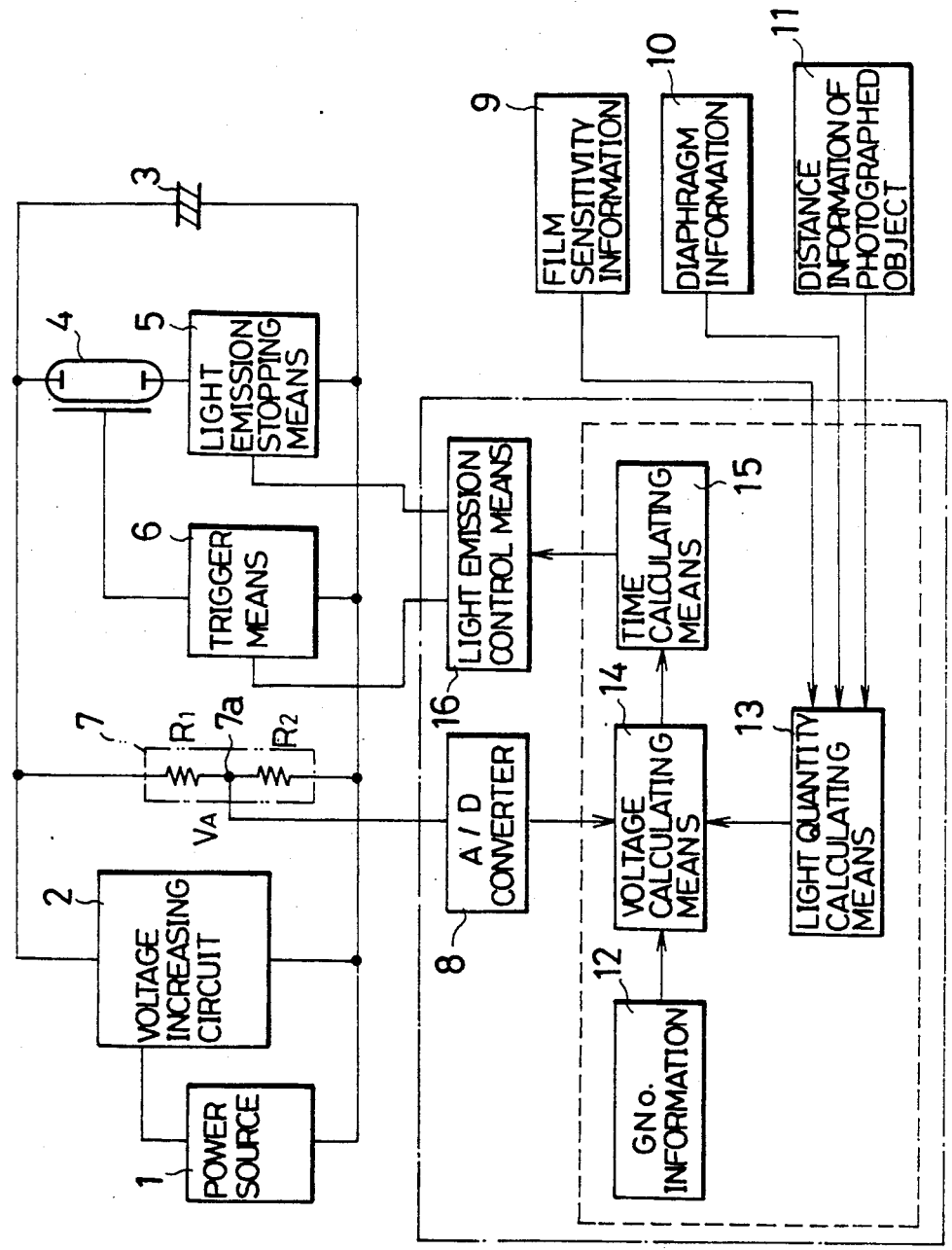
FIG. 1 is a view showing the construction of a stroboscopic controller in one embodiment of the present invention.

FIG. 1 is a view showing the construction of a stroboscopic controller in one embodiment of the present invention. In FIG. 1, reference numerals 1, 2 and 3 respectively designate a power source, a voltage increasing circuit composed of a DC/DC converter, and a main capacitor. A xenon lamp 4 constitutes a light emitting tube. A light emission stopping means 5 is connected in series to the xenon lamp 4. A trigger means 6 is disposed to start the operation of the xenon lamp 4. A voltage dividing circuit 7 is connected in parallel to the main capacitor 3 and is composed of resistors $R_1$ and $R_2$ connected in series to each other. An A/D (analog/digital) converter 8 is connected to a connection portion 7a of the series resistors $R_1$ and $R_2$ of the voltage dividing circuit 7 and this constitutes a voltage measuring means for measuring a voltage of the main capacitor 3. A film sensitivity information output section 9 outputs information with respect to film sensitivity. A diaphragm information output section 10 outputs diaphragm information of a photographing lens. A photographed object distance information output section 11 outputs distance information with respect to a photographed object. A GNo. information output section 12 outputs information with respect to a basic guide number. A light quantity calculating means 13 receives data from the film sensitivity information output section 9, the diaphragm information output section 10 and the photographed object distance information output section 11. The light quantity calculating means 13 calculates a quantity of light required to illuminate the photographed object based on these data. A voltage calculating means 14 receives data from the A/D converter 8, the GNo. information output section 12 and the light quantity calculating means 13. The voltage calculating means 14 calculates the voltage of the main capacitor 3 at a stopping time of light emission based on these data. A time calculating means 15 receives data of the voltage calculating means 14 and calculates a stroboscopic light emitting time for which the voltage of the main capacitor 3 is changed by the stroboscopic light emission from a charging voltage before the light emission to a voltage at a stopping time of the light emission. A light emission control means 16 receives data from the time calculating means 15 and controls a light emitting operation of the xenon lamp 4 and a stopping operation thereof through the light emission stopping means 5 and the trigger means 6.

In the above embodiment, a voltage of the power source 1 is set to about several volts and is then increased to several hundred volts by the voltage increasing circuit 2, thereby storing an electric charge to the main capacitor 3. A first charging voltage of the main capacitor 3 before the light emission is partially divided by the resistors $R_1$ and $R_2$ of the voltage dividing circuit 7 and is inputted to the A/D converter 8 and is then outputted to the voltage calculating means 14 as a digital value. The voltage calculating means 14 calculates a second voltage of the main capacitor 3 by the above first voltage and data of the GNo. information output section 12 after a quantity of light calculated by the light quantity calculating means 13 is emitted. This second voltage is a voltage of the main capacitor 3 for stopping the light emission of the xenon lamp 4. The calculated second voltage is outputted to the time calculating means 15. The time calculating means 15 calculates a stroboscope light emitting time for which the voltage of the main capacitor 3 is changed by the light emission of the xenon lamp 4 from the first voltage to the second voltage. When the stroboscopic light emitting time is calculated by the time calculating means 15, the light emission control means 16 operates the trigger means 6 to emit light from the xenon lamp 4. The light emission stopping means 5 is operated after the stroboscopic light emitting time has passed from the light emitting time of the xenon lamp 4, thereby stopping the light emitting operation of the xenon lamp 4.

Calculating methods of the respective calculating means in the above embodiment will next be described.

The quantity of light required to illuminate the photographed object in the light quantity calculating means 13 shows a guide number calculated by a diaphragm value F of the photographing lens and a distance D from a camera to the photographed object. This guide number is calculated from the diaphragm value F and the distance D by the following relation.

$$GNo. = F \cdot D \qquad (1)$$

In this case, a value of the guide number is changed when film sensitivity (ISO sensitivity) is changed. In the following description, the ISO sensitivity is set to 100 except for a case in which this ISO sensitivity is set to a special value.

A method for calculating the second voltage in the voltage calculating means 14 will next be described.

In the following description, reference numeral $V_{HO}$ designates a voltage of the main capacitor 3 at a full charging time thereof. Reference numeral $V_{TO}$ designates a remaining voltage of the main capacitor 3 after the completion of the full light emission. Reference numeral $GNo._0$ designates a quantity of the emitted light provided when the light emission is started at the voltage $V_{HO}$ and is stopped at the voltage $V_{TO}$. The distance from the camera to the photographed object is set to D and the diaphragm value of the lens is set to F. Reference numeral $GNo._x$ designates a quantity of the emitted light required to perform a photographing operation. In this case, the quantity $GNo._x$ of the emitted light is provided as follows from the above formula (1).

$$GNo._x = D \cdot F \qquad (2)$$

If the same quantity of light is provided in a unit area by stroboscopic light, energy E emitted from the stroboscope has the following relation.

$$E \propto D^2 \qquad (3)$$

From the formula (2), the following relation (4) is obtained.

$$D \propto GNo. \qquad (4)$$

Accordingly, the energy E has the following relation (5).

$$E \propto GNo.^2 \qquad (5)$$

In the following description, reference numeral $E_0$ designates energy emitted from the stroboscope at the voltages $V_{HO}$ and $V_{TO}$. Reference numeral C designates a capacity of the main capacitor 3 and reference numeral K designates a proportional constant. In this case, the energy $E_0$ is provided by the following formula (6).

$$E_0 = \frac{1}{2} \cdot C \cdot (V_{HO}^2 - V_{TO}^2) = K \cdot GNo._0^2 \qquad (6)$$

Figure 2:
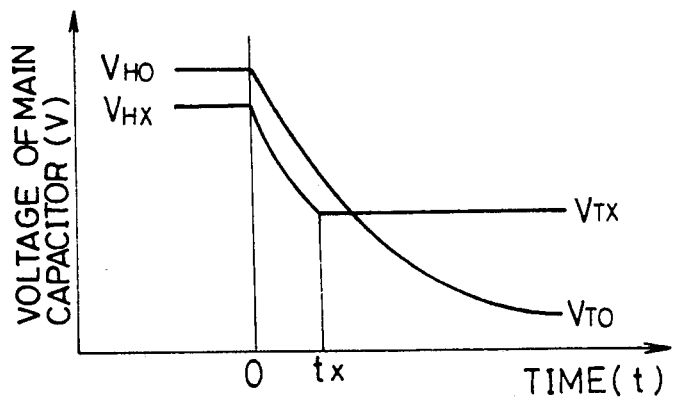
FIG. 2 is a graph for explaining charging and discharging operations of a main capacitor.

In FIG. 2, reference numeral $V_{HX}$ designates an arbitrary voltage of the main capacitor 3 before the light emission is started. Reference numeral $V_{TX}$ designates a remaining voltage of the main capacitor 3 after the light emission is completed. The light emission is shown by a curve from the voltage $V_{HX}$ to the voltage $V_{TX}$ in FIG. 2. Energy $E_x$ emitted from the voltage $V_{HX}$ to the voltage $V_{TX}$ is provided by the following formula (7).

$$E_x = \frac{1}{2} \cdot C \cdot (V_{Hx}^2 - V_{Tx}^2) = K \cdot GNo._x^2 \qquad (7)$$

In the following description, reference numeral x designates a ratio of the guide number $GNo._x$ as a guide number required to perform the photographing operation to the guide number $GNo._0$ as a reference guide number. In this case, the ratio x is provided by the following formula (8).

$$x = GNo._x / GNo._0 \tag{8}$$

Accordingly, the following formula (9) is obtained.

$$x^2 = \frac{GNo._x{}^2}{GNo._0{}^2} = \frac{E_x}{E_0} = \frac{V_{Hx}^2 - V_{Tx}^2}{V_{HO}^2 - V_{TO}^2} \tag{9}$$

A square value $V_{TX}^2$ of the voltage $V_{TX}$ after the completion of the light emission is provided as follows from the above formula (9).

$$V_{TX}^2 = V_{HX}^2 - x^2 \cdot (V_{HO}^2 - V_{TO}^2) \tag{10}$$

Otherwise, the following formula (11) is obtained.

$$V_{Tx}^2 = V_{Hx}^2 - \frac{GNo._x{}^2}{GNo._0{}^2} \cdot (V_{HO}^2 = V_{TO}^2) \tag{11}$$

This voltage $V_{TX}$ is the above-mentioned second voltage and the voltage $V_{HX}$ corresponds to the first voltage. Further, the values $GNo._0$, $V_{HO}$ and $V_{TO}$ constitute the basic guide number information stored to the GNo. information output section 12 in advance.

In this embodiment, the voltage of the main capacitor 3 is partially divided by the resistors $R_1$ and $R_2$ of the voltage dividing circuit 7 and is inputted to the A/D converter 8. When this inputted voltage is set to $V_A$, the voltage $V_{HX}$ as the first voltage is provided by the following formula (12).

$$V_{Hx} = \frac{R_1 + R_2}{R_2} \cdot V_A \tag{12}$$

To simplify the above formula (10), the voltage $V_{TO}$ is set as follows.

$$V_{TO} = y \cdot V_{HO} \tag{13}$$

In this case, the value $V_{TX}^2$ is provided by the following formula (14).

$$V_{TX}^2 = V_{HO}^2 - x^2 \cdot (1 - y^2) \cdot V_{HO}^2 \tag{14}$$

The voltage $V_{HO}$ is a voltage of the main capacitor 3 at the full charging time thereof. The voltage $V_{TO}$ is a voltage of the main capacitor 3 at the completing time of the full light emission. For example, when $V_{HO}$ is equal to 330 volts and $V_{TO}$ is equal to 40 volts, y is equal to $40/330 \approx 0.12$. Accordingly, $1-y^2$ is approximately equal to one so that the formula (14) is changed to the following formula (15).

$$V_{TX}^2 = V_{HX}^2 - x^2 \cdot V_{HO}^2 \tag{15}$$

Therefore, the basic guide number information is constructed by only $GNo._0$ and $V_{HO}$ so that the second voltage is simply calculated.

Further, when the operation of the stroboscopic controller is controlled such that light is emitted in a state in which the voltage $V_{HX}$ as the first voltage is equal to the voltage $V_{HO}$ at any time, the following formula (16) is obtained.

$$V_{TX}^2 = (1 - x^2) \cdot V_{HO}^2 \tag{16}$$

Accordingly, it is not necessary to dispose a means for measuring the first voltage.

In the above description, the voltage $V_{HO}$ is set to a voltage of the main capacitor 3 at the full charging time thereof. However, the voltage $V_{HO}$ is not limited to the voltage of the main capacitor 3 at the full charging time thereof. Namely, the voltage $V_{HO}$ can be set to a voltage for allowing the light emission and corresponding to a known guide number. In this case, the respective calculating operations mentioned above are not influenced by this allowing voltage. Further, the above voltage $V_{TO}$ is not limited to the voltage of the main capacitor at the completing time of the full light emission.

A method for calculating the stroboscopic light emitting time from the first voltage to the second voltage in the time calculating means 15 will next be described.

The above stroboscopic light emitting time is provided as shown in FIG. 2 when a time for starting the light emission by the xenon lamp 4 is set to zero and a time from the emission of the required light quantity to the stoppage thereof is set to $t_x$. Namely, the stroboscopic light emitting time is a time from the first voltage $V_{HX}$ to the second voltage $V_{TX}$ with respect to the voltage of the main capacitor 3.

A discharging operation of the charged main capacitor 3 is performed in accordance with the capacity C of the main capacitor 3 and an impedance R of a discharging loop of the capacitor. In this case, the voltage $V_{TX}$ is provided by the following formula (17).

$$V_{Tx} = V_{Hx} \cdot e^{-\frac{t}{CR}} \tag{17}$$

From the above formula (17), the time $t_x$ is provided as follows.

$$t_x = C \cdot R \log e \frac{V_{Hx}}{V_{Tx}} \tag{18}$$

Thus, it is possible to calculate the stroboscopic light emitting time for providing the required quantity of light from the above formula (18).

In FIG. 1, the discharging loop of a charge stored to the main capacitor 3 is a loop formed from one terminal of the main capacitor 3 through the xenon lamp 4 and the light emission stopping means 5 to the other terminal of the main capacitor 3. A dominant impedance of this discharging loop is constructed by an impedance of the xenon lamp 4. Impedance characteristics of this xenon lamp 4 are provided as shown by a curve 1 in FIG. 3.

Figure 3:
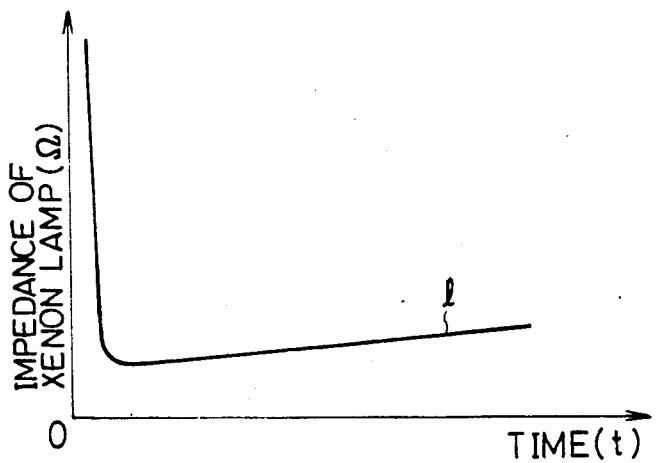
FIGS. 3 and 4 are graphs for explaining impedance characteristics of a xenon lamp.

In FIG. 3, when the light emission of the xenon lamp 4 is started, the impedance R is rapidly decreased to several ohms ($\Omega$) for a time about 10$\mu$ seconds. Further, the impedance R is gradually decreased and is then gradually increased until about 200$\mu$ seconds. This increase in impedance is about 1 to 2 ohms even for a time of 1 m second. Accordingly, it is possible to treat the impedance R as a constant value in a period in which the impedance is gradually increased. In such a case, the above formulas (17) and (18) are formed.

Values of the impedance R are different from each other in accordance with the construction of the xenon lamp 4. For example, a reduced limit value of the impedance R is changed in accordance with differences in gas pressure and inner diameter of the xenon lamp 4. Further, a time indicative of this reduced limit value of the impedance R is slightly different from that shown in FIG. 3. However, the impedance characteristics are approximately similar to those shown in FIG. 3.

Figure 4:
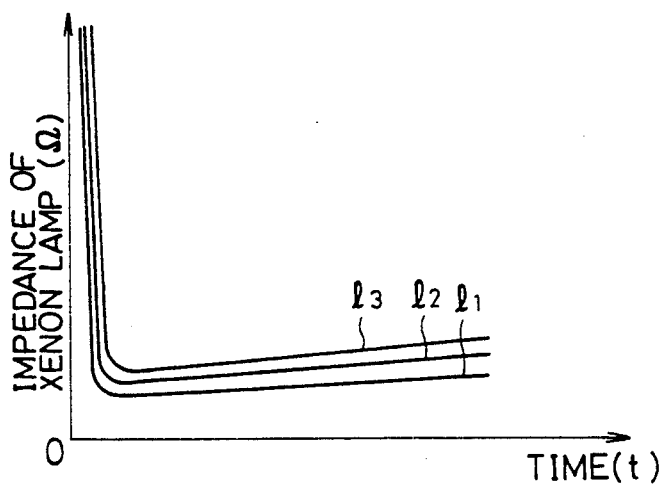

The characteristics of the impedance R at different values of the voltage $V_{HX}$ for starting the light emission are provided as shown in FIG. 4. In FIG. 4, the voltage for starting the light emission is increased in an order of curves $l_1$, $l_2$ and $l_3$. Values of the impedance value R with respect to these curves are slightly different from each other. With respect to a lowest value of the impedance R, the difference between values of the impedance R with respect to the curves $l_1$ and $l_3$ is about 0.2 to 0.3 Ω even when the difference in light emission starting voltage between these curves is about 100 volts. Therefore, no problem is caused even when the impedance R is treated as a constant value irrespective of the light emission starting voltage.

When the value of the impedance R is changed by the voltage $V_{HX}$ as the first voltage, it is possible to control the light emitting operation and the stopping operation thereof with respect to the xenon lamp 4 with high accuracy.

In the above description, only the impedance R of the xenon lamp 4 is considered with respect to the above formulas (17) and (18). However, it is necessary that the resistance value of a wiring resistor within the above discharging loop or the resistance value of a resistor in the light emission stopping means 5 is also included in the above value of the impedance R. Further, in the above formulas (17) and (18), the discharging time is calculated with respect to the fixed values of the capacity C and the impedance R. However, it is considered that the value of the impedance R is divided into plural values and an approximate calculation thereof is made. It is also considered to correct a time delay amount in the light emitting operation and the stopping operation thereof with respect to the xenon lamp 4 by adding this delay amount to the above formula (18).

When a thyristor is used as the above light emission stopping means 5, the quantity of the emitted light is excessively increased by a commutating capacitor when the light emission is stopped. However, it is possible to correct this quantity of the emitted light in calculations of the formulas (10), (11), (18), etc. When an insulated gate bipolar transistor (IGBT) is used as the light emission stopping means 5, it is possible to improve the accuracy in control of the stroboscopic controller without correcting the quantity of the emitted light.

The three kinds of calculations of the light quantity calculating means 13, the voltage calculating means 14 and the time calculating means 15 are considered to be one calculation when these three calculating means 13, 14 and 15 and the GNo. information output section 12 surrounded by a broken line in FIG. 1 are built-in a one-chip microcomputer. Further, the A/D converter 8 or the light emission stopping means 16 can be built-in this one-chip microcomputer as surrounded by one-dotted chain line in FIG. 1.

In this embodiment, the light emitting operation and the stopping operation thereof with respect to the xenon lamp 4 are performed on two control lines through the light emission stopping means 5 and the trigger means 6. However, it is considered that these two control lines are combined with each other as only one control line, or a mechanical means such as a known X-contact is also used.

In the above embodiment, it is not necessary to dispose a light-receiving and integrating circuit required in the general stroboscopic controller so that the number of parts is reduced and the cost of the stroboscopic controller and a space therefor are reduced. Further, no reflected light is used to control the operation of the stroboscopic controller so that no difference in reflectivity with respect to a photographed object or a film is caused, or no error in control of the stroboscopic controller is caused by an unnecessary quantity of light. Therefore, it is possible to provide a series control structure for the stroboscopic controller so that only a required quantity of light energy is emitted and can be rapidly prepared for the next light emission.

In the above embodiment, the light emitting operation is controlled before the light emission by the quantity of light calculated from information indicative of film sensitivity, the diaphragm of a photographing lens, and the distance from a camera to the photographed object. Therefore, it is possible to set an arbitrary diaphragm value. Further, it is possible to give a warning, display and stop the operation of a shutter when the photographing operation is performed at a long distance from the camera to the photographed object and the quantity of light is insufficient even in the case of an open diaphragm.

Further, in the above embodiment, it is not necessary to store the relation between the light emitting time and the quantity of emitted light as a large amount of data as in the general stroboscopic controller. Further, it is possible to emit light from the stroboscope when a voltage greater than a voltage for allowing the light emission is applied to the main capacitor 3.

In the above embodiment, it is easy to integrate measuring, calculating and control elements such as the A/D converter 8, the time calculating means 15, etc. with each other. When such elements are built-in a one-chip microcomputer, the cost of the stroboscopic controller and a space therefor are not increased. The detecting and output means with respect to information indicative of the film sensitivity, the diaphragm of the photographing lens and the distance from the camera to the photographed object required to control the light emitting operation and the stopping operation thereof can be constituted by means provided in the general camera so that it is not necessary to dispose a new means in the camera.

In accordance with the present invention, discharging voltage and time for providing a quantity of light required to perform the photographing operation are calculated from a charging voltage of the main capacitor. The quantity of light is controlled with high accuracy even when memory data required to make such a calculation are less than those in the general stroboscopic controller. Further, there is no control error caused by the difference in reflectivity, etc. as in a method using a photometric means so that the quantity of light is controlled with a high degree of accuracy. Further, it is not necessary to dispose a photometric circuit so that the number of parts is greatly reduced and the cost of the stroboscopic controller and a space therefor are reduced. Thus, it is possible to provide a stroboscopic controller having a simplified structure and accurately emitting stroboscopic light.

Many widely different embodiments of the present invention may be constructed without departing from the spirit and scope of the present invention. It should be understood that the present invention is not limited to the specific embodiments described in the specification, except as defined in the appended claims.

What is claimed is:

1. A stroboscopic controller for illuminating a photographed object by discharging a charge stored to a main capacitor through a light emitting tube, said stroboscopic controller comprising:

voltage measuring means for measuring a charging voltage of the main capacitor before light emission;

light quantity calculating means for calculating a quantity of light required to illuminate the photographed object, including means for receiving information indicative of film sensitivity, diaphragm and a distance from a camera to the photographed object;

voltage calculating means for calculating a voltage of the main capacitor at a stopping time of the light emission from the charging voltage measured by said voltage measuring means and the quantity of light calculated by the light quantity calculating means;

time calculating means for calculating a stroboscopic light emitting time for which the voltage of the main capacitor is changed by the stroboscopic light emission from said charging voltage before the light emission to said voltage at the stopping time of the light emission; and light emission control means for controlling a light emitting operation and a stopping operation thereof with respect to the light emitting tube based on the stroboscopic light emitting time calculated by the time calculating means.

2. A stroboscopic controller according to claim 1, wherein the light emitting operation is controlled by the quantity of light calculated, before the light emission, from information indicative of the film sensitivity, the diaphragm of a photographing lens, the distance from a camera to the photographed object.

3. A stroboscopic controller according to claim 1, wherein the voltage calculating means includes means for receiving information indicative of a guide number.

4. A stroboscopic controller according to claim 1, wherein the light quantity calculating means, the voltage calculating means, the time calculating means and a section for outputting guide number information are built-in a one-chip microcomputer.

5. A stroboscopic controller for illuminating a photographed object by discharging a charge stored in a main capacitor through a light emitting tube, said stroboscopic controller comprising:

voltage measuring means for measuring a charging voltage of the main capacitor before light emission;

light quantity calculating means for calculating a quantity of light required to illuminate the photographed object;

voltage calculating means for calculating a voltage of the main capacitor at a stopping time of the light emission from the charging voltage measured by said voltage measuring means and the quantity of light calculated by the light quantity calculating means;

time calculating means for calculating a stroboscopic light emitting time for which the voltage of the main capacitor is changed by the stroboscopic light emission from said charging voltage before the light emission to said voltage at the stopping time of the light emission; and light emission control means for controlling a light emitting operation and a stopping operation thereof with respect to the light emitting tube based on the stroboscopic light emitting time calculated by the time calculating means, said light emitting operation is controlled by the quantity of light calculated, before the light emission, from information indicative of a film sensitivity, diaphragm of a photographing lens, a distance from a camera to the photographed object.

6. A stroboscopic controller according to claim 5, wherein the voltage calculating means includes means for receiving information indicative of a guide number.

7. A stroboscopic controller according to claim 5, wherein the light quantity calculating means, the voltage calculating means, the time calculating means and a section for outputting guide number information are built-in a one-chip microcomputer.

8. A stroboscopic controller according to claim 7, wherein at least one of the voltage measuring means or the light emission control means are also built-in the one-chip microcomputer.

* * * * *